(12) United States Patent
Lee

(10) Patent No.: US 12,333,121 B2
(45) Date of Patent: Jun. 17, 2025

(54) METHOD FOR CAPTURING IMAGES FOR MULTI WINDOWS AND ELECTRONIC DEVICE THEREFOR

(71) Applicant: Samsung Electronics Co., Ltd., Suwon-si (KR)

(72) Inventor: Hyundo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/486,687

(22) Filed: Oct. 13, 2023

(65) Prior Publication Data

US 2024/0045560 A1 Feb. 8, 2024

Related U.S. Application Data

(63) Continuation of application No. 17/428,020, filed as application No. PCT/KR2021/009950 on Jul. 30, 2021, now Pat. No. 11,822,760.

(30) Foreign Application Priority Data

Aug. 3, 2020 (KR) ........................ 10-2020-0097034

(51) Int. Cl.
*G06F 3/048* (2013.01)
*G06F 3/0481* (2022.01)
(Continued)

(52) U.S. Cl.
CPC .......... *G06F 3/0481* (2013.01); *G06F 3/0486* (2013.01); *G06F 3/04886* (2013.01)

(58) Field of Classification Search
CPC .. G06F 3/0481; G06F 3/0486; G06F 3/04886; G06F 3/04845;
(Continued)

(56) References Cited

U.S. PATENT DOCUMENTS 9,176,703 B2 11/2015 Kim et al.
9,268,463 B2 2/2016 Jung et al.
(Continued)

FOREIGN PATENT DOCUMENTS

CN 109407936 A * 3/2019 ......... G06F 3/04845
CN 109726712 A * 5/2019
(Continued)

OTHER PUBLICATIONS

International Search Report dated Nov. 10, 2021, issued in International Application No. PCT/KR2021/009950.
(Continued)

*Primary Examiner* — Rashawn N Tillery
(74) *Attorney, Agent, or Firm* — Jefferson IP Law, LLP

(57) ABSTRACT

An electronic device is provided. The electronic device includes a display, at least one processor, and a memory connected to the at least one processor. The memory stores instructions that, when executed, cause the at least one processor to display a first window and a second window on the display, capture the first window and the second window if a specified input is received, and display a first indicator corresponding to a captured image of the first window and a second indicator corresponding to a captured image of the second window on the display.

18 Claims, 16 Drawing Sheets

(51) Int. Cl.
*G06F 3/0486* (2013.01)
*G06F 3/04886* (2022.01)
(58) Field of Classification Search
CPC .. G06F 2203/04803; G06T 7/11; G06T 11/60; G06T 2207/20021
See application file for complete search history.

(56) References Cited

U.S. PATENT DOCUMENTS

| | | | |
|---|---|---|---|
| 9,582,482 B1 | 2/2017 | Sharifi et al. | |
| 9,762,651 B1 | 9/2017 | Sharifi et al. | |
| 9,788,179 B1 | 10/2017 | Sharifi et al. | |
| 9,939,979 B2 | 4/2018 | Sung | |
| 10,001,903 B2 | 6/2018 | Yi et al. | |
| 10,244,369 B1 | 3/2019 | Sharifi et al. | |
| 10,409,472 B2 | 9/2019 | Lee et al. | |
| 10,884,620 B2 | 1/2021 | Kim et al. | |
| 10,963,630 B1 | 3/2021 | Sharifi et al. | |
| 11,210,458 B2 | 12/2021 | Jon et al. | |
| 11,681,866 B2 | 6/2023 | Jon et al. | |
| 2006/0280364 A1* | 12/2006 | Ma | G06V 10/25 345/620 |
| 2012/0044137 A1* | 2/2012 | Oddiraju | G09G 5/395 345/530 |
| 2013/0225236 A1 | 8/2013 | Lee et al. | |
| 2013/0332878 A1 | 12/2013 | Sung | |
| 2014/0002389 A1 | 1/2014 | Kim et al. | |
| 2014/0075389 A1 | 3/2014 | Kim | |
| 2014/0164957 A1 | 6/2014 | Shin | |
| 2014/0313143 A1 | 10/2014 | Jung et al. | |
| 2014/0372540 A1* | 12/2014 | Libin | H04L 12/1822 709/206 |
| 2015/0205488 A1 | 7/2015 | Yi et al. | |
| 2015/0212713 A1* | 7/2015 | Takehara | G06F 3/04845 715/801 |
| 2015/0220814 A1* | 8/2015 | Verkasalo | G06Q 20/3255 382/103 |
| 2016/0103811 A1* | 4/2016 | Cullen | G06F 40/166 715/256 |
| 2016/0266769 A1* | 9/2016 | Oursbourn | G06F 9/451 |
| 2016/0274771 A1 | 9/2016 | Seong et al. | |
| 2017/0083182 A1 | 3/2017 | Singh et al. | |
| 2017/0337168 A1* | 11/2017 | Kunze | H04L 67/02 |
| 2018/0046341 A1 | 2/2018 | Lee et al. | |
| 2018/0052586 A1* | 2/2018 | Guan | G06F 3/04883 |
| 2018/0114326 A1* | 4/2018 | Roblek | G06T 7/30 |
| 2018/0225032 A1* | 8/2018 | Jones | G06F 16/434 |
| 2019/0147026 A1* | 5/2019 | Jon | G06F 40/171 715/230 |
| 2019/0250783 A1 | 8/2019 | Ni | |
| 2021/0089207 A1 | 3/2021 | Kim et al. | |
| 2021/0089334 A1* | 3/2021 | Thota | G06V 30/19173 |
| 2021/0248304 A1* | 8/2021 | Olivier | G06F 40/106 |
| 2022/0334697 A1 | 10/2022 | Xu et al. | |
| 2023/0185442 A1 | 6/2023 | Jung et al. | |

FOREIGN PATENT DOCUMENTS

| | | | | |
|---|---|---|---|---|
| CN | 110737386 A | | 1/2020 | |
| EP | 2741192 A2 | * | 6/2014 | ............. G06F 3/041 |
| EP | 4024188 A1 | * | 7/2022 | ......... G06F 3/04817 |
| JP | 4350137 B2 | | 10/2009 | |
| KR | 10-2014-0073396 A | | 6/2014 | |
| KR | 10-2015-0056346 A | | 5/2015 | |
| KR | 10-1834987 B1 | | 3/2018 | |
| KR | 10-2019-0064629 A | | 6/2019 | |
| KR | 10-2108069 B1 | | 5/2020 | |
| WO | WO-2020063091 A1 | * | 4/2020 | ........... G06F 3/0484 |
| WO | 2022068483 A1 | | 4/2022 | |

OTHER PUBLICATIONS

European Search Report dated Sep. 18, 2023; European Appln. No. 21853151.5-1224 / 4138037 PCT/KR2021009950.

European Office Action dated May 17, 2024, issued in European Application No. 21853151.5.

European Office Action dated Feb. 5, 2025, issued in European Application No. 21 853 151.5.

* cited by examiner

METHOD FOR CAPTURING IMAGES FOR MULTI WINDOWS AND ELECTRONIC DEVICE THEREFOR

CROSS-REFERENCE TO RELATED APPLICATION(S)

This application is a continuation application of prior application Ser. No. 17/428,020, filed on Aug. 3, 2021, which is a U.S. National Stage application under U.S.C. § 371 of an International application number PCT/KR2021/009950 filed on Jul. 30, 2021, which was based on and claimed priority under 35 U.S.C § 119(a) of a Korean patent application number 10-2020-0097034, filed on Aug. 3, 2020, in the Korean Intellectual Property Office, the disclosure of which is incorporated by reference herein in its entirety.

TECHNICAL FIELD

The disclosure relates to a method for capturing images for multi windows and an electronic device for performing the method.

BACKGROUND ART

Electronic devices may visually provide various contents (e.g., images, texts, or moving pictures) to users via a display. In order to provide more information, a display size of electronic devices is gradually increasing. In addition, technologies for increasing the size of a display surface of mobile devices are being developed. In order to increase the portability and display size of the mobile device, the form of mobile devices may be changed. For example, a portion of the mobile device may be folded or extended.

As the display size of electronic devices increases, more and more electronic devices support a multi window function. The electronic device may display multi windows corresponding to a plurality of applications on a single physical or logical display region. For example, the multi windows may correspond to execution screens of different applications, respectively. For another example, at least some of the multi windows may be a plurality of windows for one application.

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may capture a display screen displayed based on a specified input. For example, the electronic device may capture the full screen if a specified input is received. In a multi window display environment, a user may want to capture an image for one of the multi windows. In this case, the user has to generate a capture screen for one window by editing the captured full screen. In addition, if the user wants to perform another operation (e.g., sharing) on the edited image, the user has to load the capture screen generated in the corresponding application. Accordingly, the experience of the user may be degraded.

Aspects of the disclosure are to address at least the above-mentioned problems and/or disadvantages and to provide at least the advantages described below. Accordingly, an aspect of the disclosure is to provide an electronic device and a method for addressing the above-described problems.

Additional aspects will be set forth in part in the description which follows and, in part, will be apparent from the description, or may be learned by practice of the presented embodiments.

Technical Solution

Various respective aspects and features of the disclosure are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

In accordance with an aspect of the disclosure, an electronic device is provided. The electronic device includes a display, at least one processor, and a memory operatively connected to the processor, in which the memory stores instructions that, when executed, cause the processor to display a first window and a second window on the display, capture the first window and the second window if a specified input is received, and display a first indicator corresponding to a captured image of the first window and a second indicator corresponding to a captured image of the second window on the display.

In accordance with another aspect of the disclosure, a method for providing images captured by an electronic device is provided. The method includes displaying a first window and a second window, receiving a specified input for capture, capturing the first window and the second window if the specified input is received, and displaying a first indicator corresponding to a captured image of the first window and a second indicator corresponding to a captured image of the second window on at least one of the first window or the second window.

It is an aim of certain embodiments of the disclosure to address, mitigate or obviate, at least partly, at least one of the problems and/or disadvantages associated with the prior art. Certain embodiments aim to provide at least one of the advantages described below.

Advantageous Effects

According to various embodiments disclosed in the disclosure, the electronic device may provide indications for capture screens for multi windows.

The electronic device according to an embodiment disclosed in the disclosure may reduce a user input step when capturing multi windows by providing editing on the capture screens through indications.

The electronic device according to an embodiment disclosed in the disclosure may improve a user experience by providing a function, such as sharing the capture screens through the indications.

Besides, various effects may be provided that are directly or indirectly identified through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
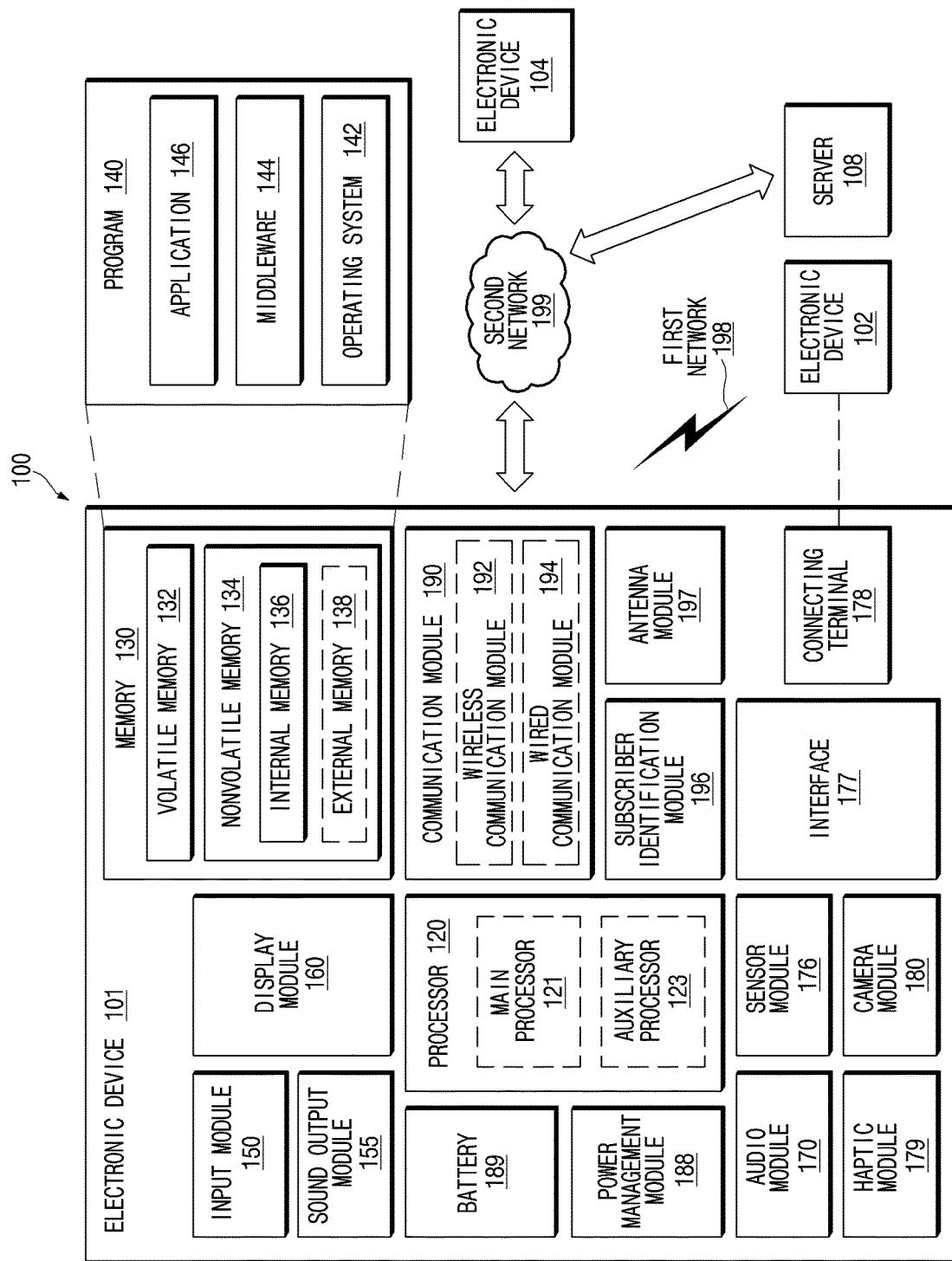
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123

(e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
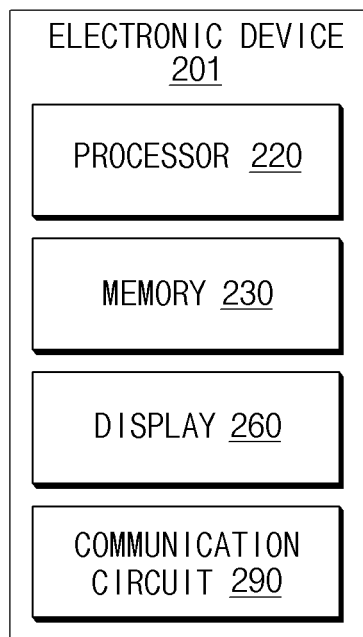
FIG. 2 illustrates a block diagram of an electronic device according to an embodiment of the disclosure.

FIG. 2 illustrates a block diagram of an electronic device according to an embodiment of the disclosure.

Referring to FIG. 2, an electronic device 201 may include a processor 220 (e.g., the processor 120 of FIG. 1), a memory 230 (e.g., the memory 130 of FIG. 1), a display 260 (the display module 160 of FIG. 1), and/or a communication circuit 290 (e.g., the communication module 190 of FIG. 1). The processor 220 may be operatively connected to other components of the electronic device 201 and may control various operations of the electronic device 201. The processor 220 may perform various operations of the electronic device 201 by executing one or more instructions stored in the memory 230. Hereinafter, operations described as being performed by the electronic device 201 may be referred to as being performed by the processor 220. The memory 330 may be operatively connected to at least the processor 220 and may store instructions. The memory 230 may store various types of information. For example, the memory 230 may store a backup application for exchanging backup data. The display 260 may include a flexible display. The communication circuit 290 may support communication based on at least one communication protocol.

According to an embodiment of the disclosure, the processor 220 may display an execution screen including multi windows on the display 260. For example, the processor 220 may display multi windows based on a user input or application pairing setting. For another example, the processor 220 may display multi windows by displaying a pop-up window on the execution screen.

The processor 220 may capture multi windows if a specified input is received. The specified input may include, for example, a palm touch, a swipe touch, a multi-touch, or an input to a specified button. The processor 220 may acquire a captured image for an entire region including multi windows. The processor 220 may acquire a captured image for each of the multi windows.

The processor 220 may display indicators for multi windows if a specified input is received. For example, the processor 220 may display a first indicator for the first window and a second indicator for the second window if a specified input is received while the first window and the second window are being displayed. The first indicator may include a thumbnail corresponding to the captured image of the first window, and the second indicator may include a thumbnail corresponding to the captured image of the second window. The processor 220 may further display a third indicator for the full screen on the display 260.

The processor 220 may determine whether an input to the indicator is received. For example, the processor 220 may end the display of the indicator if the input to the indicator is not received within a specified time. The processor 220 may display an editing UI for editing a captured image corresponding to the indicator if a first type input (e.g., tapping input) to the indicator is received. For example, the editing UI may be provided in a state in which a capture region corresponding to the indicator is selected. The processor 220 may execute a specified function corresponding to the indicator if a second type input (e.g., long press or drag input) to the indicator is received. For example, the captured image corresponding to the indicator may be processed by using an application corresponding to the position where the second type of input is released.

The components of the electronic device 201 illustrated in FIG. 2 are examples of the disclosure are not limited thereto. For example, the electronic device 201 may further include a component not illustrated in FIG. 2.

Figure 3:
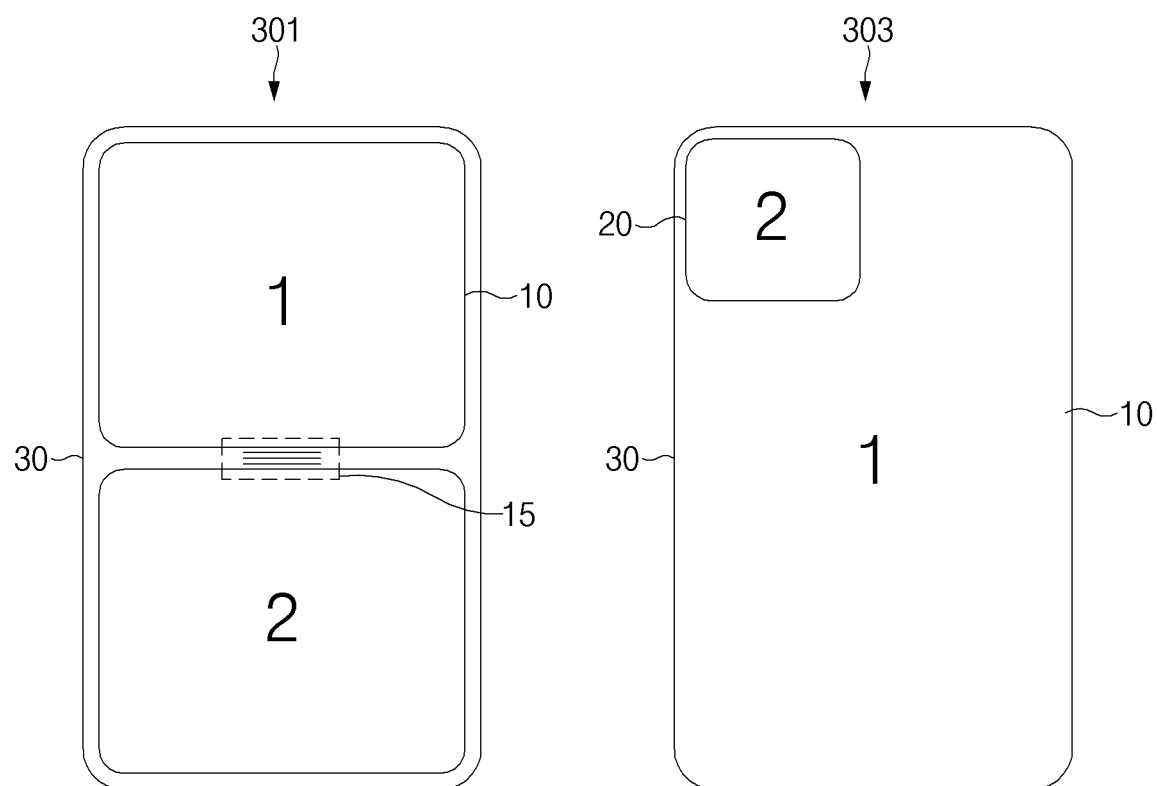
FIG. 3 illustrates a multi window display environment according to an embodiment of the disclosure.

FIG. 3 illustrates a multi window display environment according to an embodiment of the disclosure.

Referring to reference number 301 of FIG. 3, the electronic device 201 may display a multi window environment including the first window 10 and the second window 20. The entire display region of the display may be referred to as the full screen 30. In the example of reference number 301, the electronic device 201 may display the first window 10 and the second window 20 through split screens. For example, the first window 10 may be displayed in a first display region of the full screen 30, and the second window 20 may be displayed in a second display region of the full screen 30. The first display region and the second display region may be logically divided displays. The shapes and sizes of the first window 10 and the second window 20 are exemplary, and embodiments of the disclosure are not limited thereto. For example, the electronic device 201 may change the size of the first window 10 and/or the second window 20 based on an input to a control bar 15.

Referring to reference number 303, the electronic device 201 may display a multi window environment including the first window 10 and the second window 20. The electronic device 201 may display the first window 10 in a region corresponding to the full screen 30 and the second window 20 as a pop-up image. For example, the first window 10 may be displayed in the first display region corresponding to the full screen and the second window 20 may be displayed in the second display region, which is a partial region of the first display region. The shapes and sizes of the first window 10 and the second window 20 are exemplary, and embodiments of the disclosure are not limited thereto. For example, the electronic device 201 may change the size and/or position of the second window 20 based on a user input to the second window 20.

The first window 10 may correspond to the execution screen of the first application, and the second window 20 may correspond to the execution screen of the second application. For example, the first window 10 may correspond to the execution screen of a messenger application, and the second window 20 may correspond to the execution screen of an Internet application.

The first window 10 and the second window 20 may correspond to the execution screen of the same application. For example, the first window 10 may correspond to a first web page access screen of an Internet browser application, and the second window 20 may correspond to a second web page access screen of the Internet browser application.

Hereinafter, the term "execution screen" may be referred to as a screen that is changeable in real time depending on the execution state of an application. The term "window" may correspond to a layer of an execution screen. The term "full screen" may refer to a screen corresponding to a displayable region of the display 260 of the electronic device 201. According to an embodiment of the disclosure, the electronic device 201 may display multi windows on the full screen 30 by merging execution screens corresponding to respective windows. For example, the electronic device 201 may merge a plurality of execution screens using a surface flinger. The electronic device 201 may merge a plurality of execution screens on the same layer or may merge a plurality of execution screens on different layers.

In the following examples, unless otherwise described, a description of the same reference number may be referred to by the description of FIG. 3.

Figure 4:
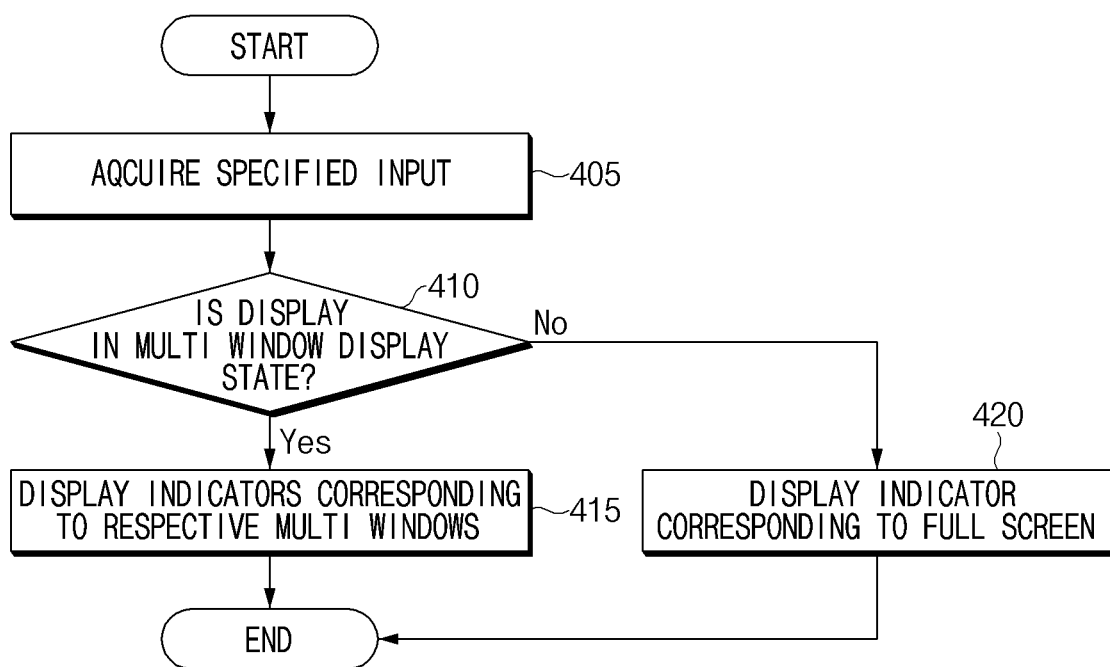
FIG. 4 is a flowchart of a method for displaying multi window indicators according to an embodiment of the disclosure.

FIG. 4 is a flowchart of a method for displaying multi window indicators according to an embodiment of the disclosure.

Referring to FIG. 4, in operation 405, the electronic device 201 may acquire a specified input. The specified input may be an input for capturing a screen of the electronic device 201. For example, the specified input may include, for example, a palm touch, a swipe touch, a multi-touch, or an input to a specified button. For example, upon acquiring the specified input, the electronic device 201 may acquire a captured image for the full screen 30. For example, upon acquiring the specified input, the electronic device 201 may further acquire captured images for respective multi windows.

In operation 410, the electronic device 201 may determine whether the display is in a multi window display state. If the display is not in the multi window display state at the time of receiving the specified input (e.g., No in operation 410), in operation 420, the electronic device 201 may display an indicator corresponding to the full screen 30. The indicator corresponding to the full screen 30 may include a captured image of the full screen 30. For example, the indicator may include a thumbnail corresponding to the captured image for the full screen 30.

If the display is in the multi window display state (e.g., Yes in operation 410), in operation 415, the electronic device 201 may display indicators corresponding to respective the multi windows. For example, if the multi windows include the first window 10 and the second window 20, the electronic device 201 may display the first indicator corresponding to the first window 10 and the second indicator corresponding to the second window 20. For example, the first indicator may include a thumbnail corresponding to the captured image of the first window 10. The second indicator may include a thumbnail corresponding to the captured image of the second window 20. In operation 415, the electronic device 201 may also display the indicator corresponding to the full screen 30.

In the above-described example, the indicators may be displayed as floating images on the execution screen (e.g., the first window 10 and/or the second window 20). In the following examples, an indicator displayed in response to a capture input may be referred to as a capture indicator. As will be described later with reference to FIG. 6, the capture indicator may be referred to as a shortcut that provides control over a captured image. The indicator is an object provided visually, and may be referred to as a graphic object.

Figure 5:
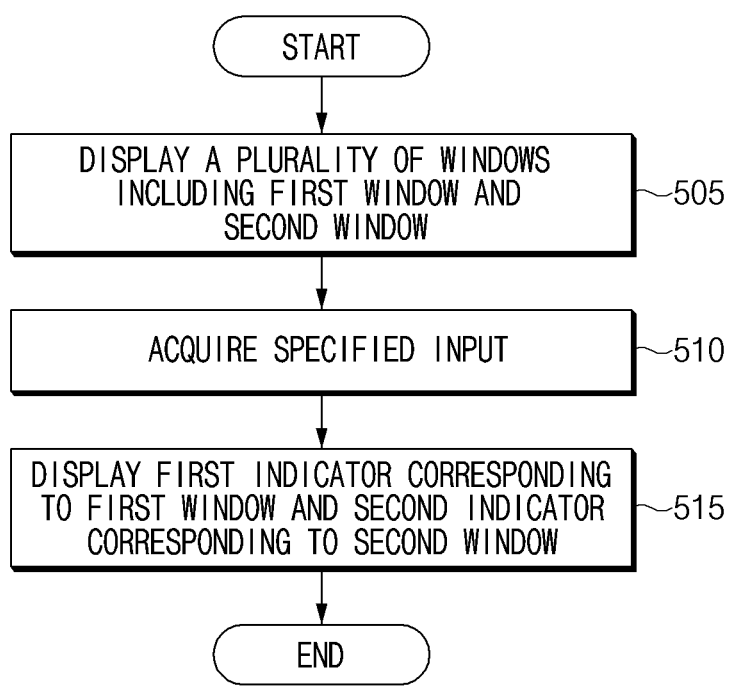
FIG. 5 is a flowchart of a method for displaying multi window indicators according to an embodiment of the disclosure.

FIG. 5 is a flowchart of a method for displaying multi window indicators according to an embodiment of the disclosure.

in the example of FIG. 4, the operation of determining whether the display is in the multi window display state (e.g., operation 410) may be omitted. For example, as described with reference to FIG. 5, it may be assumed that the method for displaying indicators is performed in a multi window display state.

Referring to FIG. 5, in operation 505, the electronic device 201 may display a plurality of windows including the first window 10 and the second window 20.

In operation 510, the electronic device 201 may acquire a specified input while displaying a plurality of windows. For example, the specified input may include any input that causes the electronic device 201 to perform capture.

In operation 515, the electronic device 201 may display the first indicator corresponding to the first window 10 and the second indicator corresponding to the second window 20. As described above with respect to operation 415 of FIG. 4, the electronic device 201 may further display the indicator corresponding to the full screen 30.

Figure 6:
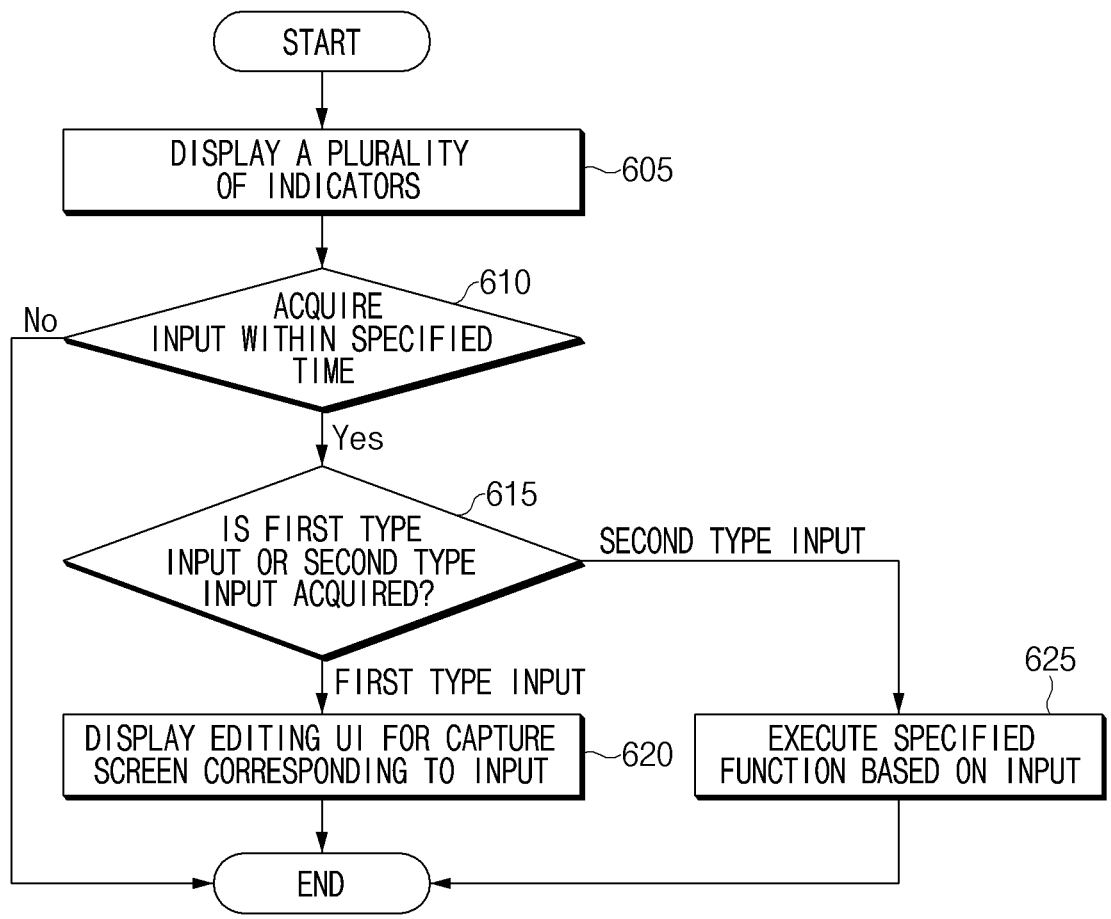
FIG. 6 is a flowchart of a method for processing an input to an indicator according to an embodiment of the disclosure.

FIG. 6 is a flowchart of a method for processing an input to an indicator according to an embodiment of the disclosure.

Referring to FIG. 6, in operation 605, the electronic device 201 may display a plurality of indicators. For example, operation 605 may correspond to operation 415 of FIG. 4 or operation 515 of FIG. 5.

In operation 610, the electronic device 201 may display the indicators and then determine whether an input is acquired within a specified time. For example, if an input to one of a plurality of displayed indicators is received, the electronic device 201 may determine that the input has been acquired. The electronic device 201 may receive the input by receiving a touch input from an arbitrary touch means, such as a user's hand or a stylus.

If the input is not acquired within the specified time (e.g., No in operation 610), the electronic device 201 may end the method for processing the input. The electronic device 201 may end the display of the plurality of indicators.

If the input is acquired within the specified time (e.g., Yes in operation 610), in operation 615, the electronic device 201 may determine whether the acquired input is a first type input or a second type input. For example, the first type input may be a tapping on an indicator (e.g., a touch input maintained for less than a specified time). For example, the second type input may include a long press input (e.g., an input maintained for a specified time or longer) or a drag input to the indicator.

If the first type input is acquired, in operation 620, the electronic device 201 may display an editing UI for the capture screen corresponding to the input. For example, if the first type input to the indicator corresponding to the first window 10 is acquired, the electronic device 201 may provide an editing UI for the captured image corresponding to the first window 10. If the first type input to the indicator corresponding to the second window 20 is acquired, the electronic device 201 may provide an editing UI for the captured image corresponding to the second window 20. If the first type input to the indicator corresponding to the full screen 30 is acquired, the electronic device 201 may provide an editing UI for the captured image corresponding to the full screen 30.

If the second type input is acquired, in operation 625, the electronic device 201 may execute a specified function based on the input. The specified function may include, for example, a function of using the captured image for an indicator that has acquired the input. If the second type input is an input for dropping, to the first window the indicator corresponding to the first window 10 (e.g., the touch input is released within the region of the first window 10 by dragging the indicator), the electronic device 201 may process the captured image corresponding to the first window 10 by using a first application related to the first window 10. If the second type input is an input for dropping the indicator corresponding to the first window 10 to the second window 20, the electronic device 201 may process the captured image corresponding to the first window 10 by using a second application related to the second window 20. If the second type input is an input for dropping the indicator corresponding to the second window to the first window 10, the electronic device 201 may process the captured image corresponding to the second window 20 by using the first application related to the first window 10. If the second type input is an input for dropping, to the second window 20, the indicator corresponding to the second window 20, the electronic device 201 may process the captured image corresponding to the second window 20 by using the second application related to the second window 20. If the application related to the window in which the second type input is released does not support processing of the captured image, the electronic device 201 may provide a notification indicating that the processing of the captured image by the first application is not supported.

The specified function may be determined according to an application corresponding to a window (hereinafter, referred to as a target window) in which the second type input is released. For example, if the application related to the target window is a messenger application, the electronic device 201 may transmit a message including a captured image by using the messenger application. If the application associated with the target window is a social network service (SNS) application, the electronic device 201 may provide a UI capable of uploading a captured image on the SNS service.

Figure 7:
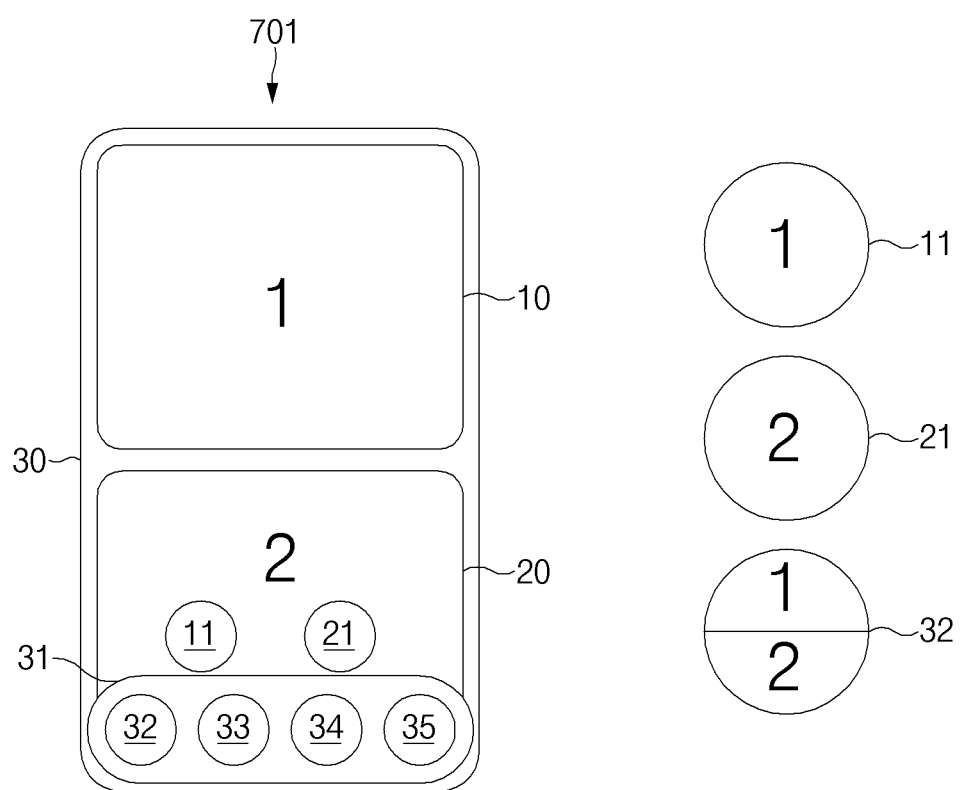
FIG. 7 illustrates a capture indicator user interface (UI) according to an embodiment of the disclosure.

FIG. 7 illustrates a capture indicator UI according to an embodiment of the disclosure.

Referring to FIG. 7, referring to reference number 701, the electronic device 201 may display capture indicators if a specified input is received (e.g., operation 405 of FIG. 4 or operation 510 of FIG. 5). For example, if a specified input is received while the first window 10 and the second window 20 are being displayed, the electronic device 201 may display a first indicator 11 corresponding to the first window 10 and a second indicator 21 corresponding to the second window 20. For example, the first indicator 11 may include a thumbnail corresponding to the captured image of the first window 10. The second indicator 21 may include a thumbnail corresponding to the captured image of the second window 20. The first indicator 11 and the second indicator 21 are displayed on the second window 20; however, embodiments of the disclosure are not limited thereto. For example, the shapes and/or positions of the first indicator 11 and the second indicator 21 may be different from those in the example of FIG. 7.

The electronic device 201 may further display a third indicator 32 corresponding to the capture screen of the full screen if a specified input is received. For example, the third indicator 32 may include a thumbnail corresponding to the captured image of the full screen 30. The electronic device 201 may display the third indicator 32 in a toolbar 31. The toolbar 31 may provide various functions for the captured image of the full screen 30. For example, the toolbar 31 may include the third indicator 32, an editing icon 33, a tag icon 34, and a sharing icon 35. The electronic device 201 may execute an editing function for the captured image of the full screen 30 if an input to the editing icon 33 is received. The electronic device 201 may execute a function for managing tags on the captured image of the full screen 30 if an input to the tag icon 34 is received. The electronic device 201 may execute a function for sharing the captured image of the full screen 30 if an input to the sharing icon 35 is received.

The electronic device 201 may display the first indicator 11, the second indicator 21, and the toolbar 31 if a specified input (e.g., an input for capture) is received. During the display of the first indicator 11, the second indicator 21, and/or the toolbar 31, the electronic device 201 may change the display content of the first window 10 and/or the second window 20 depending on the execution state of the application. For example, the electronic device 201 may change the display content of the first window 10 depending on the execution state of the first application. The electronic device 201 may change the display content of the second window 20 depending on the execution state of the second application.

The electronic device 201 may end the display of the first indicator 11, the second indicator 21, and the toolbar 31 if a specified condition is satisfied. For example, the electronic device 201 may end the display of the first indicator 11, the second indicator 21, and the toolbar 31 if the input to the first indicator 11, the second indicator 21, or the toolbar 31 is received. For example, the electronic device 201 may end the display of the first indicator 11, the second indicator 21, and the toolbar 31, if a specified time elapses without receiving any input after the display of the first indicator 11, the second indicator 21, or the toolbar 31. For example, the electronic device 201 may end the display of the first indicator 11, the second indicator 21, and the toolbar 31 if a cancellation input is received.

Figure 8:
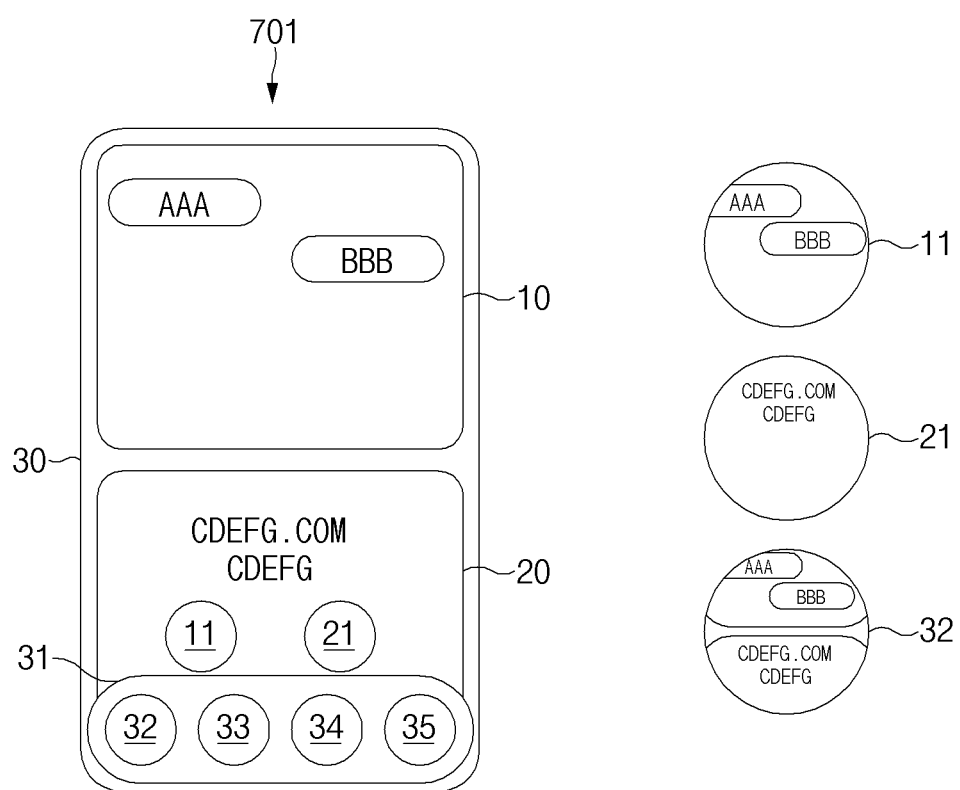
FIG. 8 illustrates a capture indicator UI according to an embodiment of the disclosure.

FIG. 8 illustrates a capture indicator UI according to an embodiment of the disclosure. FIG. 8 illustrates an example of the indicator UI described above with reference to FIG. 7.

Referring to FIG. 8, the first window 10 may correspond to the execution screen of a messenger application, and the second window 20 may correspond to the execution screen of an Internet application. As illustrated in FIG. 8, the first indicator 11 may include a thumbnail corresponding to a capture screen of the messenger application related to the first window 10. The second indicator 21 may include a thumbnail corresponding to an execution screen of the Internet browser. The third indicator 32 may include a thumbnail corresponding to the captured image of the full screen 30.

As described above with reference to FIG. 7, the electronic device 201 may change the display states of the first window 10 and the second window 20 depending on the execution state of the first application and/or the second application. For example, the electronic device 201 may display a message on the first window 10 if the message is received by using the messenger application.

Figure 9:
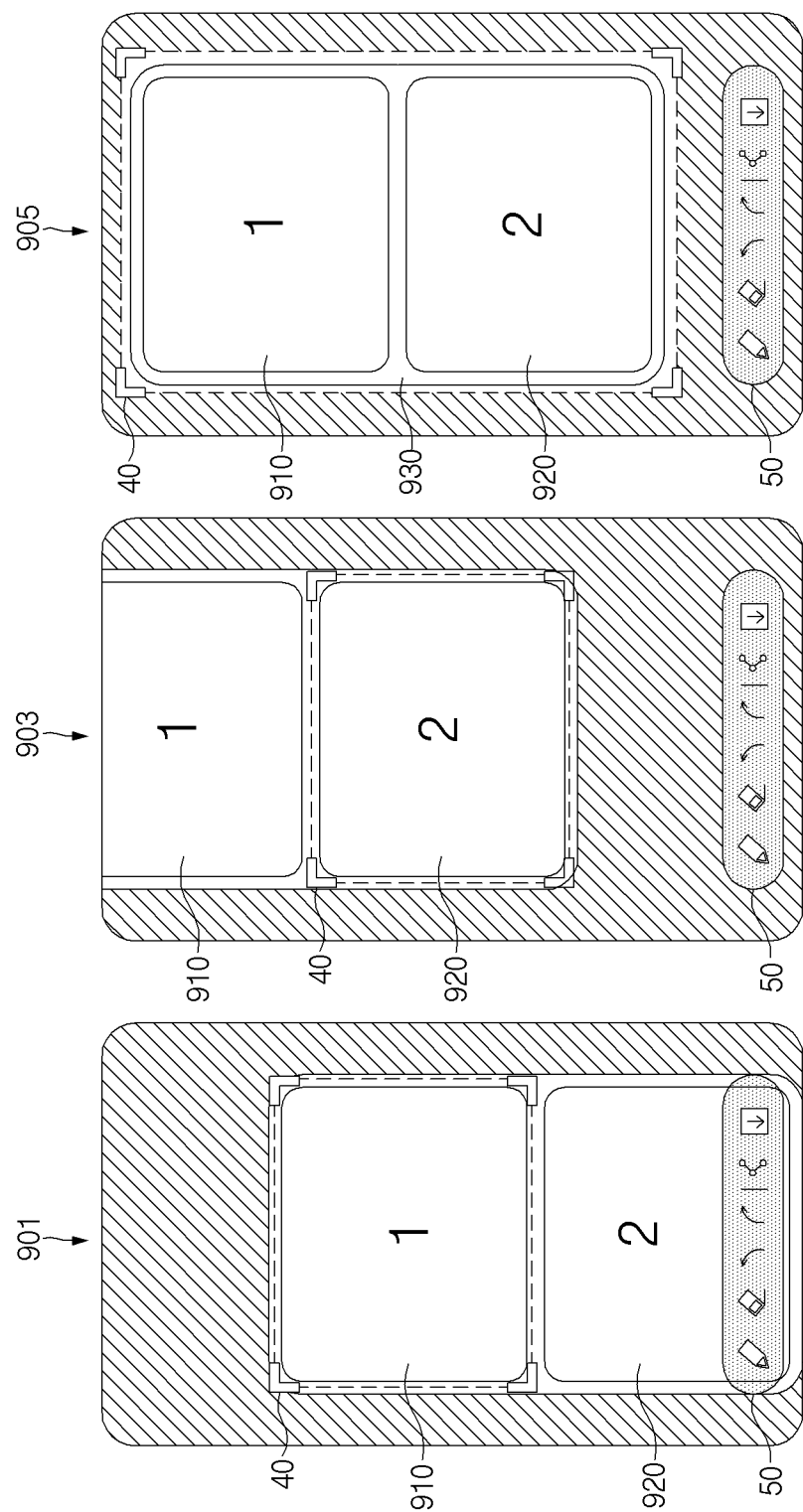
FIG. 9 illustrates an editing UI according to an embodiment of the disclosure.

FIG. 9 illustrates an editing of a UI according to an embodiment of the disclosure.

Referring to FIG. 9, according to an embodiment of the disclosure, the electronic device 201 may display the editing UI for editing a captured image corresponding to the indicator (e.g., operation 620 of FIG. 6), if a first type input to the indicator is received. For example, the electronic device 201 may be configured to capture an image corresponding to the full screen if a specified input is received. The electronic device 201 may capture the image corresponding to the full screen by storing the output screen merged by the surface flinger in the memory. With reference to FIG. 9, examples of the editing UI related to the example of the capture indicator UI of FIG. 7 may be described.

Referring to reference number 901, the electronic device 201 may display an editing UI for editing the first captured image 910 corresponding to the first window in the captured image corresponding to the full screen 30 of FIG. 7, if the first type input to the first indicator 11 is received. For example, the editing UI may include a selection guide 40 for indicating that the first captured image 910 is selected in the entire captured image. The user may change the selected region through the input to the selection guide 40. In response to the input to the first indicator 11, the electronic device 201 may locate the first captured image 910 in the center of the screen, and automatically arrange the selection guide 40 in the first captured image 910. The editing UI may include an editing toolbar 50 that provides editing functions. For example, the editing toolbar 50 may provide editing functions, such as drawing, erasing, undoing, execution repeating, sharing, and/or saving. For example, if the user performs editing by using the editing toolbar 50, the first captured image 910 selected by the selection guide 40 may be edited. Since the selection guide 40 is automatically arranged in the first captured image 910, the user may directly edit the first captured image 910 without having to adjust the selection region in the entire captured image.

Referring to reference number 903, the electronic device 201 may display an editing UI for editing the second captured image 920 corresponding to the second window 20 in the captured image corresponding to the full screen 30 of FIG. 7, if the first type input to the second indicator 21 is received. For example, the editing UI may include the selection guide 40 for indicating that the second captured image 920 is selected in the entire captured image. In response to the input to the second indicator 21, the electronic device 201 may locate the second captured image 920 in the center of the screen, and automatically arrange the selection guide 40 in the second captured image 920. If the user performs editing by using the editing toolbar 50, the second captured image 920 selected by the selection guide 40 may be edited. Since the selection guide 40 is automatically arranged in the second captured image 920, the user may directly edit the second captured image 920 without having to adjust the selection region in the entire captured image.

Referring to reference number 905, the electronic device 201 may display an editing UI for editing the entire captured image 930 corresponding to the full screen of FIG. 7, if the first type input to the third indicator 32 is received. For example, the editing UI may include the selection guide 40 for indicating that the second captured image 930 is selected in the entire captured image.

Figure 10:
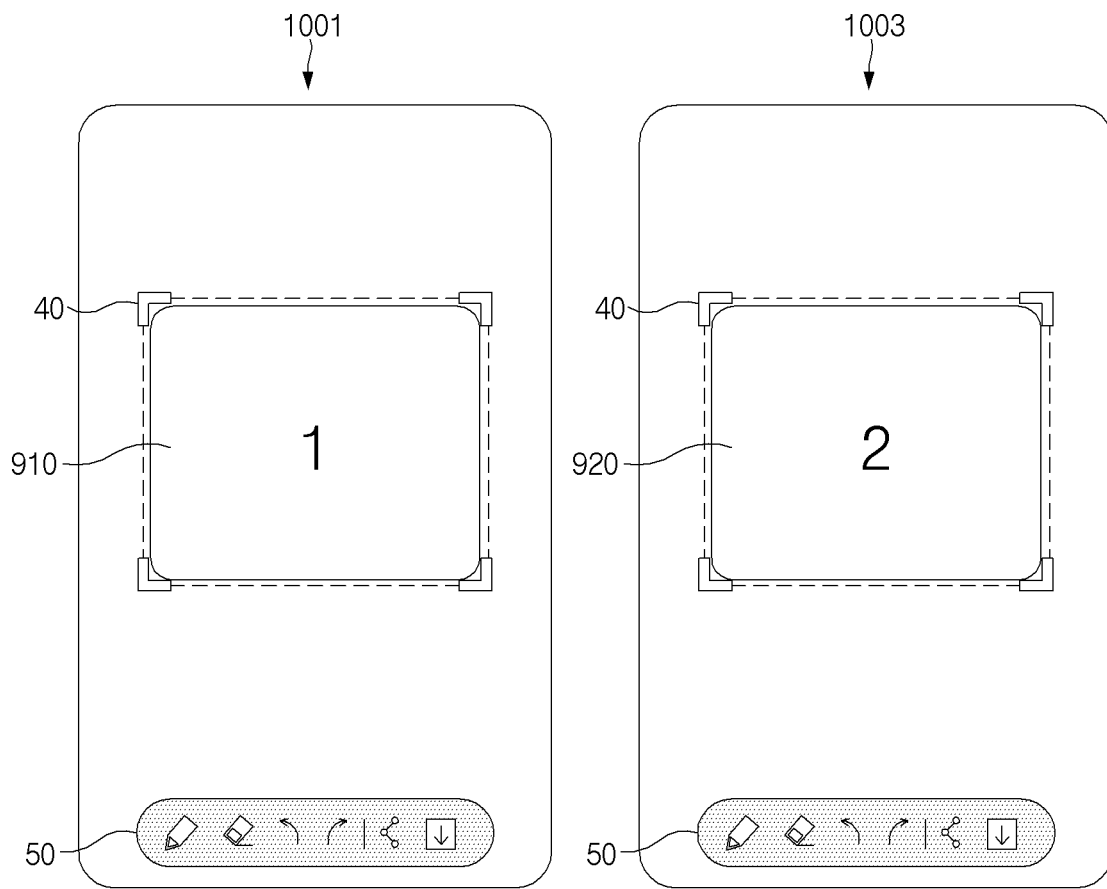
FIG. 10 illustrates an editing UI according to an embodiment of the disclosure.

FIG. 10 illustrates an editing of a UI according to an embodiment of the disclosure.

According to an embodiment of the disclosure, the electronic device 201 may display an editing UI for editing a captured image corresponding to the indicator (e.g., operation 620 of FIG. 6), if the first type input to the indicator is received. For example, the electronic device 201 may be configured to capture images corresponding to respective windows if a specified input is received. The electronic device 201 may be configured to capture images corresponding to respective windows and the image corresponding to the full screen. The electronic device 201 may capture images corresponding to respective windows by storing each of the execution screens before being merged by the surface flinger in the memory. With reference to FIG. 10, examples of the editing UI related to the example of the capture indicator UI of FIG. 7 may be described.

Referring to reference number 1001, the electronic device 201 may display the editing UI for editing the first captured image 910 corresponding to the first window 10 of FIG. 7, if the first type input to the first indicator 11 is received. For example, the editing UI may include a selection guide 40 for indicating that the first captured image 910 is selected. In response to the input to the first indicator 11, the electronic device 201 may locate the first captured image 910 in the center of the screen, and automatically arrange the selection guide 40 in the first captured image 910. If the user performs editing by using the editing toolbar 50, the first captured image 910 selected by the selection guide 40 may be edited.

Referring to reference number 1003, the electronic device 201 may display the editing UI for editing the second captured image 920 corresponding to the second window 20 of FIG. 7, if the first type input to the second indicator 21 is received. For example, the editing UI may include the selection guide 40 for indicating that the second captured image 920 is selected. In response to the input to the second indicator 21, the electronic device 201 may locate the second captured image 920 in the center of the screen, and automatically arrange the selection guide 40 in the second captured image 920. If the user performs editing by using the editing toolbar 50, the second captured image 920 selected by the selection guide 40 may be edited.

The electronic device 201 may display the editing UI described above with reference to reference number 905 of FIG. 9 if the first type of input to the third indicator 32 of FIG. 7 is received.

Figure 11:
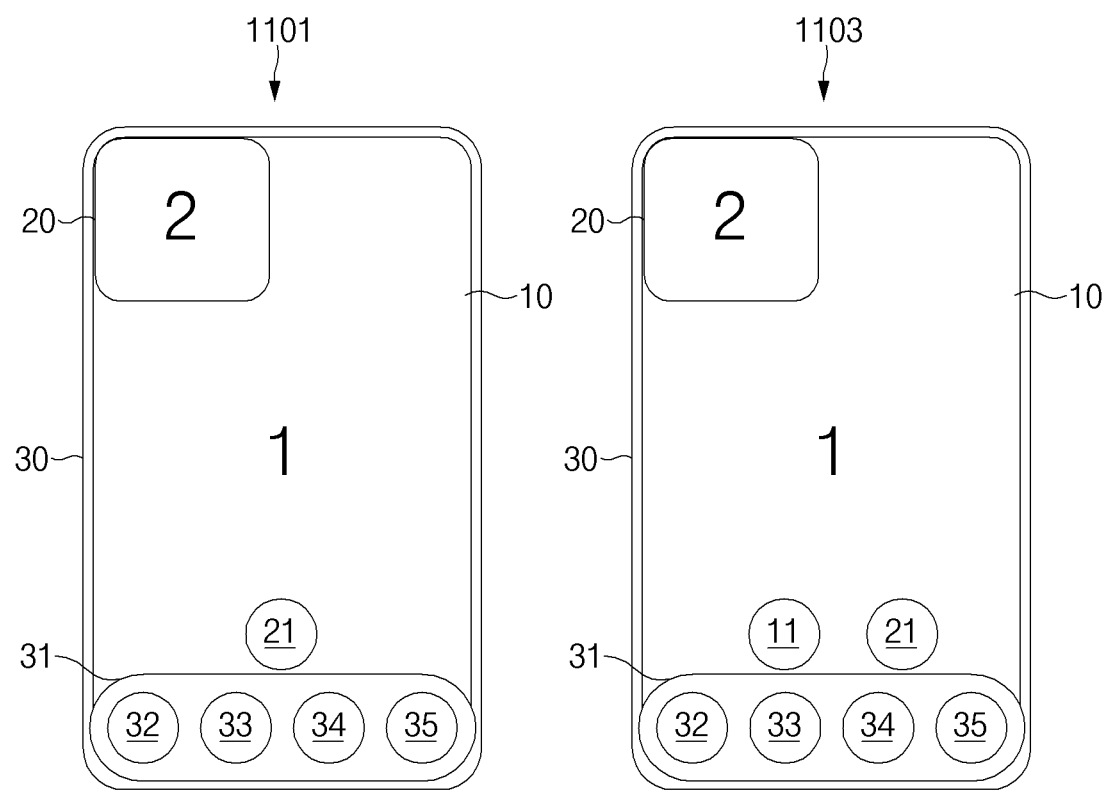
FIG. 11 illustrates a capture indicator UI according to an embodiment of the disclosure.

FIG. 11 illustrates a capture indicator UI according to an embodiment of the disclosure.

Although the method for capturing split screens has been described with reference to FIGS. 7 to 10, the above-described examples may be similarly applied to a pop-up screen. Referring to FIG. 11, the second window 20 may be referred to as a pop-up window. The second window 20 may be located on the first window 10 displayed on the full screen 30.

Referring to reference number 1101 of FIG. 11, the electronic device 201 may display capture indicators if a specified input is received (e.g., operation 405 of FIG. 4 or operation 510 of FIG. 5). For example, the electronic device 201 may be configured to acquire a captured image corresponding to the full screen 30 if a specified input is acquired while the first window 10 and the second window 20 are being displayed. The electronic device 201 may display the third indicator 32 corresponding to the full screen 30 and the second indicator 21 corresponding to the second window 20. The second indicator 21 may include a thumbnail corresponding to the captured image of the second window 20. A third indicator 30A may include a thumbnail corresponding to the captured image of the full screen 30. The electronic device 201 may display the third indicator 32 in the toolbar 31.

Referring to reference number 1103, the electronic device 201 may display capture indicators if a specified input is received (e.g., operation 405 of FIG. 4 or operation 510 of FIG. 5). For example, the electronic device 201 may be configured to capture a captured image corresponding to the first window 10, a captured image corresponding to the second window 20, and a captured image corresponding to the full screen 30, if the specified input is acquired. The captured image corresponding to the first window 10 may be an image including an execution screen of the first application covered by the second window 20. The captured image corresponding to the full screen may be a captured image as it is displayed, including the first window 10 and the second window 20. The electronic device 201 may display the third indicator 32 corresponding to the full screen 30, the first indicator 11 corresponding to the first window 10, and the second indicator 21 corresponding to the second window 20. The first indicator 11 may include a thumbnail corresponding to the captured image of the first window 10. The second indicator 21 may include a thumbnail corresponding to the captured image of the second window 20. A third indicator 30A may include a thumbnail corresponding to the captured image of the full screen 30. The electronic device 201 may display the third indicator 32 in the toolbar 31.

Figure 12:
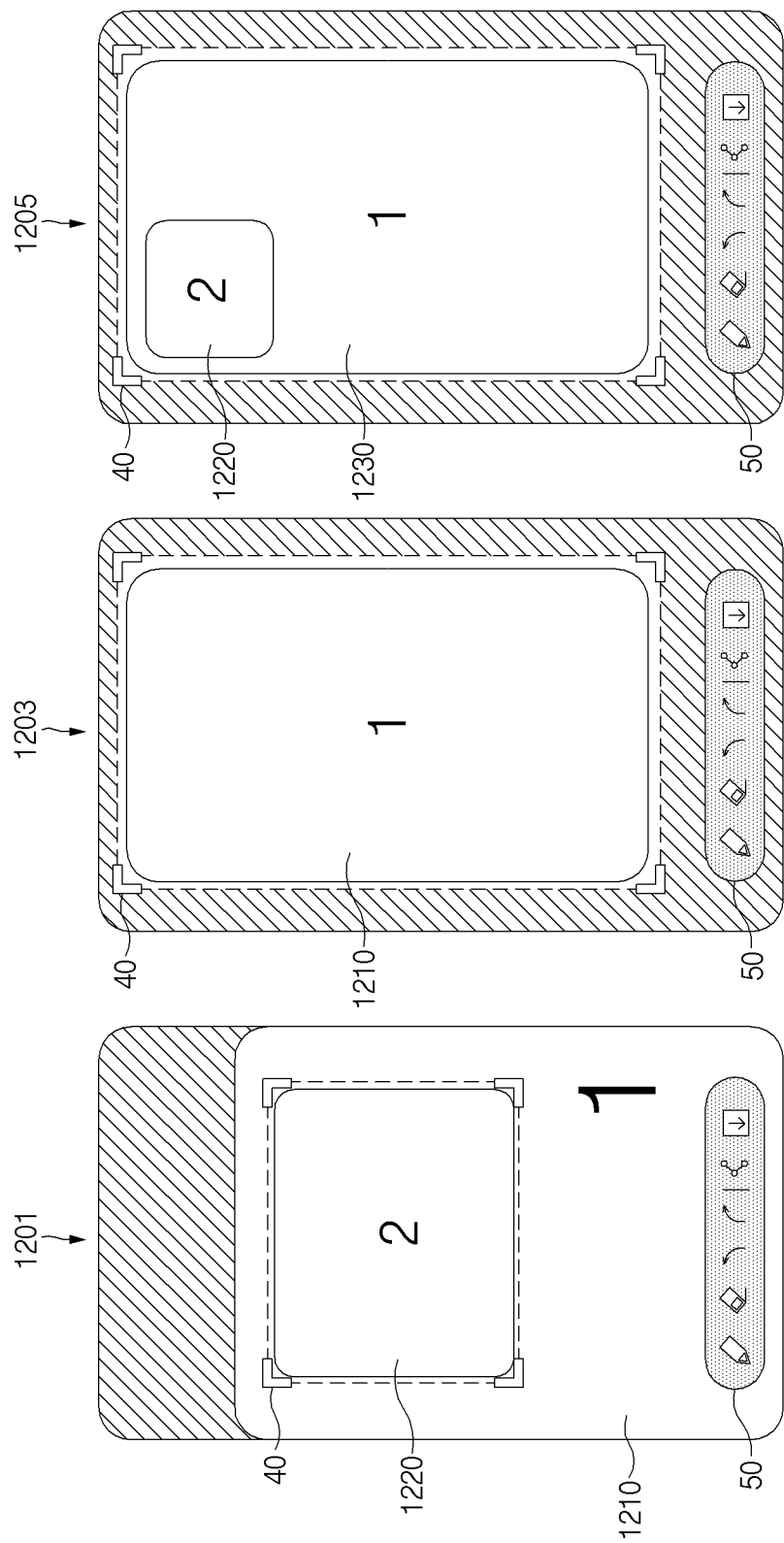
FIG. 12 illustrates an editing UI according to an embodiment of the disclosure.

FIG. 12 illustrates an editing of a UI according to an embodiment of the disclosure.

Referring to FIG. 12, according to an embodiment of the disclosure, the electronic device 201 may display the editing UI for editing a captured image corresponding to the indicator (e.g., operation 620 of FIG. 6), if the first type input to the indicator is received. With reference to FIG. 12, examples of the editing UI related to the example of the capture indicator UI of FIG. 11 may be described.

Referring to reference number 1201, the electronic device 201 may display an editing UI for editing a second captured image 1220 corresponding to the second window 30 in the captured image corresponding to the full screen 30 of FIG. 11, if the first type input to the second indicator 21 is received. For example, the editing UI may include the selection guide 40 for indicating that a second captured image 1220 is selected in the entire captured image. In response to the input to the second indicator 21, the electronic device 201 may locate the second captured image 1220 in the center of the screen, and automatically arrange the selection guide 40 in the second captured image 1220. Since the selection guide 40 is automatically arranged in the second captured image 1220, the user may directly edit the second captured image 1220 without having to adjust the selection region in the entire captured image. If the electronic device 201 acquires the second captured image 1220 for the second window 20 separately from the captured image for the full screen 30, a first captured image 1210 may be omitted.

Referring to reference number 1203, the electronic device 201 may display an editing UI for editing the first captured image 1210 corresponding to the first window 10, if the first type input to the first indicator 11 of FIG. 11 is received. For example, the editing UI may include the selection guide 40 for indicating that the first captured image 1210 is selected. In response to the input to the first indicator 11, the electronic device 201 may automatically arrange the selection guide 40 in the first captured image 1210. For example, the first captured image 1210 may include the execution image of the display region of the first window 10 covered by the second window 20. The electronic device 201 may acquire the first captured image 1210 by capturing each execution screen before merging the execution screens.

Referring to reference number 1205, the electronic device 201 may display an editing UI for editing the entire captured image 1230 corresponding to the full screen 30 of FIG. 11, if the first type input to the third indicator 32 is received. For example, the editing UI may include the selection guide 40 for indicating that the second captured image 1230 is selected in the entire captured image.

Figure 13:
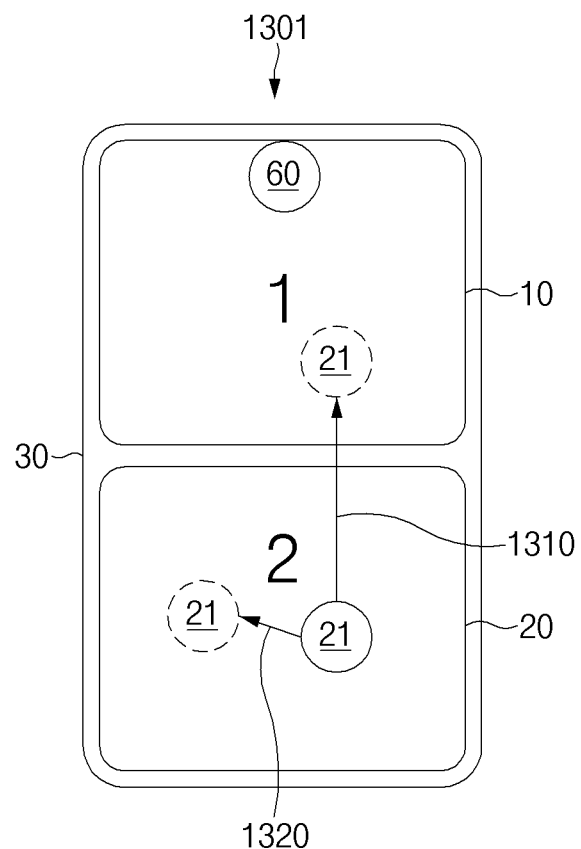
FIG. 13 illustrates a capture indicator input according to an embodiment of the disclosure.

FIG. 13 illustrates a capture indicator input according to an embodiment of the disclosure.

Referring to FIG. 13, if the second type input is received, the electronic device 201 may execute a specified function based on the received input. For example, referring to the example of FIG. 7, the second type input to the first indicator 11, the second indicator 21, or the third indicator 32 may be received. In this case, the electronic device 201 may end the display of the remaining indicators and the editing toolbar 31, excluding the indicator from which the input has been received.

Referring to FIG. 13, a second type input to the second indicator 21 may be received. The electronic device 201 may end the display of the remaining indicators, excluding the second indicator 21.

Referring to reference number 1301, the second type input may be an input 1320 released from the second window 20. In this case, the electronic device 201 may process the captured image of the second window 20 corresponding to the second indicator 21 by using the second application related to the second window 20. In FIG. 13, the input 1320 includes a drag, but the input 1320 may be a long-press input that is maintained for a specified time in place and released.

The second type input may be an input 1310 released from the first window 10. In this case, the electronic device 201 may process the captured image of the second window 20 corresponding to the second indicator 21 by using the first application related to the first window 10.

According to an embodiment of the disclosure, the electronic device 201 may display a cancel icon 60 in response to the second type input. For example, the electronic device 201 may cancel the input to the indicator if the indicator is released while overlapping at least partially with the cancel icon 60. In this case, the electronic device 201 may end the display of the cancel icon 60 and the second indicator 21.

In the example of FIG. 13, the user may perform an input to the indicator corresponding to the captured image to specify an application for processing the captured image (e.g., the first application related to the first window 10 or the second application related to the second window 20). For example, after capturing the image, the user may edit and store the captured image, execute the application, and then load the captured image from the application. Instead, the user may omit editing and saving of the captured image, execution of the application, and loading of the captured image through input to the indicator.

Figure 14:
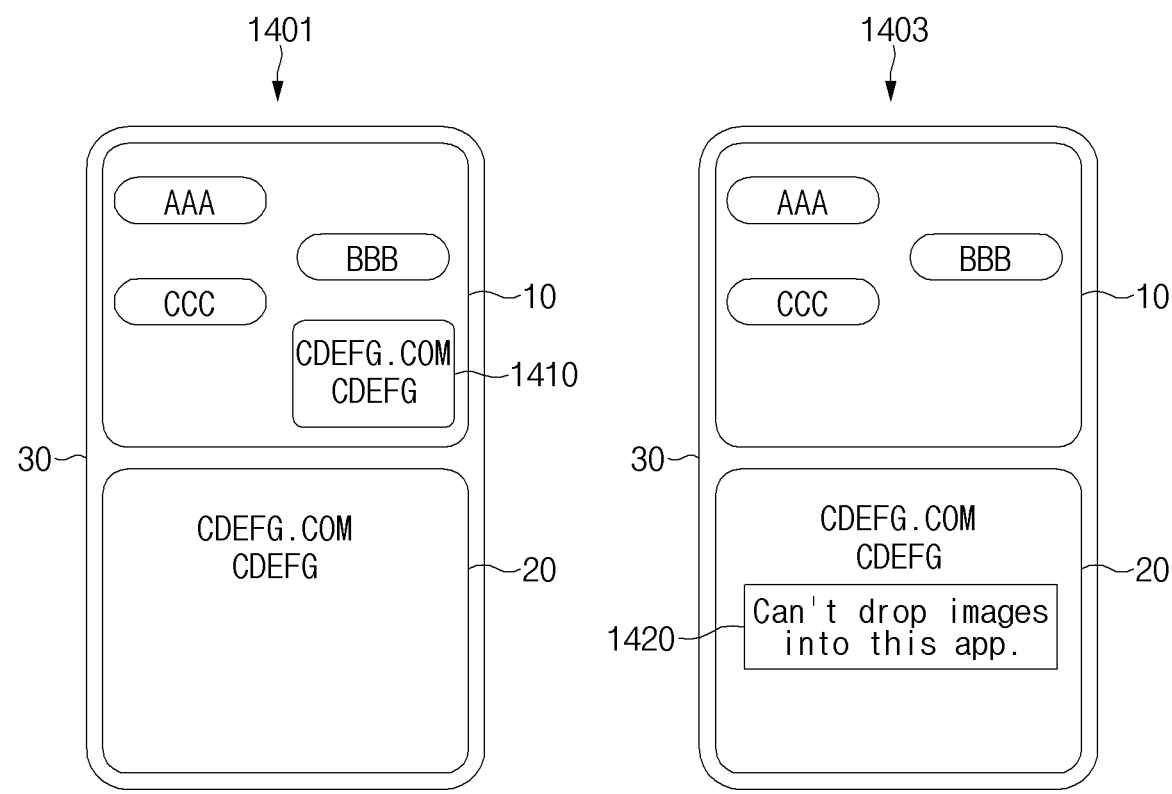
FIG. 14 illustrates a method of processing according to a capture indicator input according to an embodiment of the disclosure.

FIG. 14 illustrates a method of processing according to the capture indicator input according to an embodiment of the disclosure.

Referring to FIG. 14, execution screens of the specified functions according to the second type are illustrated. For example, the first window 10 may correspond to the execution screen of the messenger application, and the second window 20 may correspond to the execution screen of the Internet application.

Referring to reference number 1401, the second type input to the second indicator 21 of FIG. 13 may be released from the first window 10. In this case, the electronic device 201 may share the capture screen of the second window 20 corresponding to the second indicator 21 by using the messenger application related to the first window 10. For example, the electronic device 201 may transmit a message 1410 including the capture screen of the second window 20 by using the messenger application.

Referring to reference number 1403, the second type input to the second indicator 21 of FIG. 13 may be released from the second window 20. In one example, the Internet browser associated with the second window 20 may not support processing (e.g., sharing, editing, or executing) the captured image. In this case, the electronic device 201 may display a notification 1420 indicating that the application is not capable of processing the image in response to the second type input.

Figure 15:
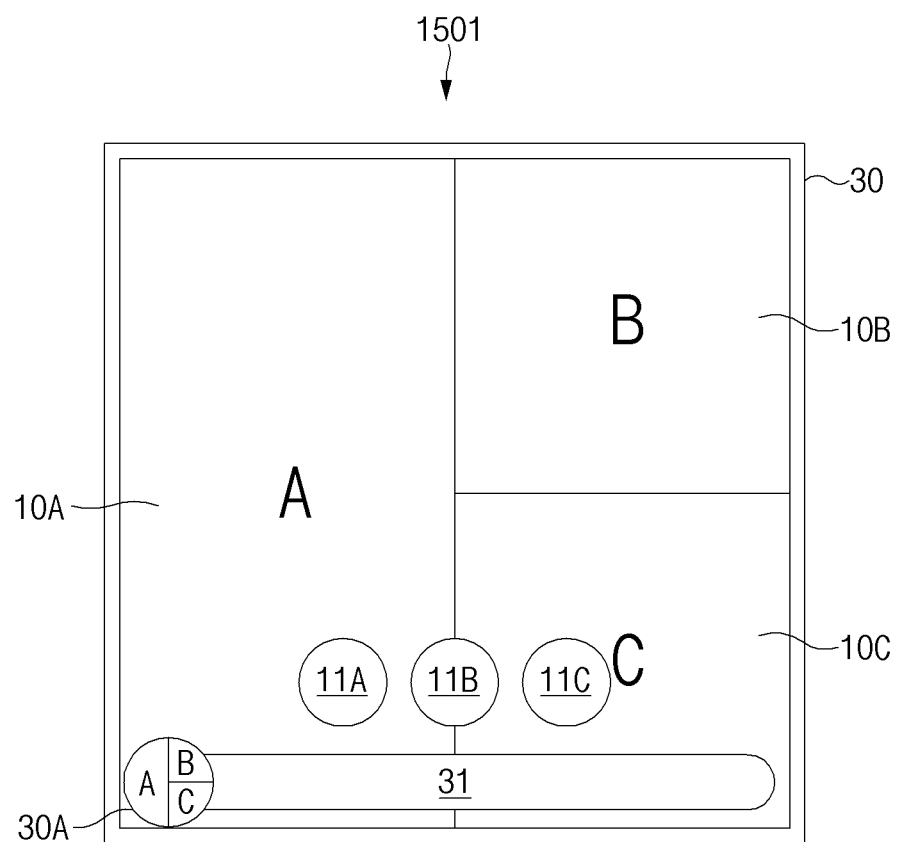
FIG. 15 illustrates a multi window capture indicator UI according to an embodiment of the disclosure.

FIG. 15 illustrates a multi window capture indicator UI according to an embodiment of the disclosure.

Referring to FIGS. 2 to 13, multi window display environments including two windows have been illustrated. However, embodiments of the disclosure are not limited thereto. For example, as illustrated in FIG. 15, the electronic device 201 may provide a similar UI for three windows.

Referring to reference number 1501, the electronic device 201 may display a first window 10A, a second window 10B, and a third window 10C. The electronic device 201 may display the capture indicator UI if a specified input (e.g., an input for capture) is received. For example, the electronic device 201 may display a first indicator 11A corresponding to the captured image of the first window 10A, a second indicator 11B corresponding to the captured image of the second window 10B, a third indicator 11C corresponding to the captured image of the third window 10C, and the full indicator 30A corresponding to the full screen 30.

For example, the first indicator 11A may include a thumbnail corresponding to the captured image of the first window 10A. The second indicator 11B may include a thumbnail corresponding to the captured image of the second window 10B. The third indicator 11C may include a thumbnail corresponding to the captured image of the third window 10C. The full indicator 30A may include a thumbnail corresponding to the captured image of the full screen 30. The thumbnail of the full indicator 30A may be generated based on the display configuration of the full screen 30. The full indicator 30A may be displayed on the toolbar 31.

Figure 16:
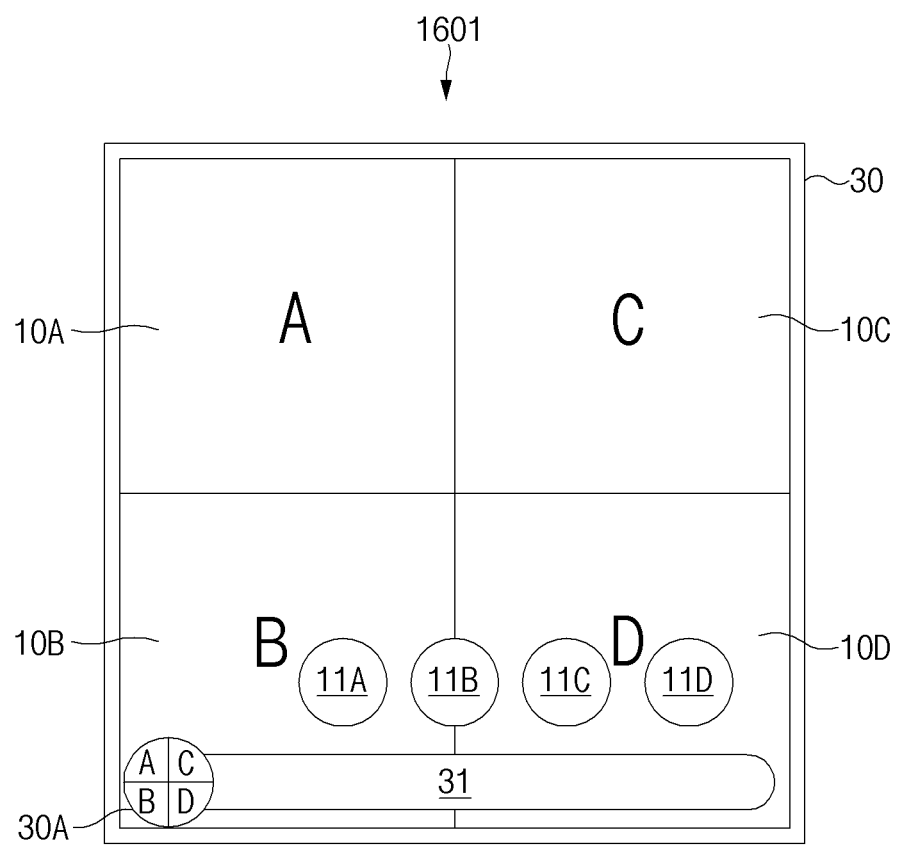
FIG. 16 illustrates a multi window capture indicator UI according to an embodiment of the disclosure.

FIG. 16 illustrates a multi window capture indicator UI according to an embodiment of the disclosure.

Referring to FIG. 16, the electronic device 201 may provide a similar UI for four windows.

Referring to reference number 1601, the electronic device 201 may display the first window 10A, the second window 10B, the third window 10C, and a fourth window 10D. The electronic device 201 may display the capture indicator UI if a specified input (e.g., an input for capture) is received. For example, the electronic device 201 may display the first indicator 11A corresponding to the captured image of the first window 10A, the second indicator 11B corresponding to the captured image of the second window 10B, the third indicator 11C corresponding to the captured image of the third window 10C, a fourth indicator 11D corresponding to the captured image of the fourth window 10D, and the full indicator 30A corresponding to the full screen 30.

For example, the first indicator 11A may include a thumbnail corresponding to the captured image of the first window 10A. The second indicator 11B may include a thumbnail corresponding to the captured image of the second window 10B. The third indicator 11C may include a thumbnail corresponding to the captured image of the third window 10C. The fourth indicator 11D may include a thumbnail corresponding to the captured image of the fourth window 10D. The full indicator 30A may include a thumbnail corresponding to the captured image of the full screen 30. The thumbnail of the full indicator 30A may be generated based on the display configuration of the full screen 30. The full indicator 30A may be displayed on the toolbar 31.

According to an embodiment of the disclosure, an electronic device (e.g., the electronic device 201 of FIG. 2) may include a display (e.g., the display 260 of FIG. 2), a processor (e.g., the processor 220 of FIG. 2), and a memory (e.g., the memory 230 of FIG. 2) operatively connected to the processor. The memory may store instructions that, when executed, cause the processor to perform operations to be described below. The processor may be configured to display a first window and a second window on the display, capture the first window and the second window if a specified input is received, and display a first indicator corresponding to a captured image of the first window and a second indicator corresponding to a captured image of the second window on the display. For example, the first indicator may include a thumbnail corresponding to the captured image of the first window, and the second indicator may include a thumbnail corresponding to the captured image of the second window. For example, the first window and the second window may constitute split screens. For another example, the second window may be a pop-up window on the first window.

The processor may be configured to display a user interface for editing the captured image of the first window if a first input to the first indicator is received. For example, the user interface may include a selection guide arranged in a region corresponding to the first window in a captured image corresponding to a full screen. For example, the user interface may include a toolbar including functions for controlling an image region selected by the selection guide.

According to an embodiment of the disclosure, the processor may be configured to process the captured image of the first window associated with the first indicator by using an application corresponding to a position where a second input to the first indicator is released, if the second input is received. The processor may be configured to process the captured image of the first window by using a first application associated with the first window if the second input is released on the first window, and process the captured image of the first window by using a second application associated with the second window if the second input is released on the second window. For example, the second input may include a drag and drop input.

A method for providing images captured by an electronic device according to an embodiment of the disclosure, the method may include displaying a first window and a second window, receiving a specified input for capture, capturing the first window and the second window if the specified input is received, and displaying a first indicator corresponding to a captured image of the first window and a second indicator corresponding to a captured image of the second window on at least one of the first window or the second window. For example, the first indicator may include a thumbnail corresponding to the captured image of the first window, and the second indicator may include a thumbnail corresponding to the captured image of the second window. For example, the first window and the second window may constitute split screens. For another example, the second window may be a pop-up window on the first window.

According to an embodiment of the disclosure, the method may further include displaying a user interface for editing the captured image of the first window if a first input to the first indicator is received. The user interface may include a selection guide arranged in a region corresponding to the first window in a captured image corresponding to a full screen. For example, the user interface may include a toolbar including functions for controlling an image region selected by the selection guide.

According to an embodiment of the disclosure, the method may further include processing the captured image of the first window associated with the first indicator by using an application corresponding to a position where a second input to the first indicator is released, if the second input is received. The processing of the captured image of the first window associated with the first indicator may include processing the captured image of the first window by using a first application associated with the first window if the second input is released on the first window, and processing the captured image of the first window by using a second application associated with the second window if the second input is released on the second window. For example, the second input may include a drag and drop input.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
at least one processor; and
memory connected to the at least one processor,
wherein the memory stores instructions that, when executed, cause the at least one processor to:
receive a screen capture input while displaying a first window and a second window on the display,
based on the screen capture input, display a first thumbnail corresponding to a first captured image of the first window, a second thumbnail corresponding to a second captured image of the second window, and a toolbar including a third thumbnail corresponding to a third captured image of a full screen,
receive a selection input for selecting a thumbnail among the first thumbnail, the second thumbnail, and the third thumbnail, and
based on the selection input, display a user interface for editing a selected captured image, among the first captured image, the second captured image, and the third captured image, corresponding to the selected thumbnail,
wherein the first thumbnail and the second thumbnail are displayed on an area other than the toolbar.

2. The electronic device of claim 1, wherein the user interface includes a selection guide arranged to the selected captured image.

3. The electronic device of claim 2, wherein the toolbar further includes functions for controlling an image region selected by the selection guide.

4. The electronic device of claim 1, wherein the first window comprises a first execution screen of a first application and the second window comprises a second execution screen of a second application.

5. The electronic device of claim 4, wherein, when executed, the instructions further cause the at least one processor to:
receive, while displaying the first thumbnail and the second thumbnail, a drag input dragging the first thumbnail and dropping the first thumbnail on the second window, and
based on the drag input, process the first captured image using the second application.

6. The electronic device of claim 5,
wherein the second application comprises a message application,
wherein, when executed, the instructions further cause the at least one processor to process the first captured image by transmitting the first captured image using the second application.

7. The electronic device of claim 1, wherein the first window and the second window constitute split screens.

8. The electronic device of claim 1, wherein the first thumbnail and the second thumbnail are displayed as floating images on at least one of the first window and the second window.

9. A method of an electronic device comprising:
receiving a screen capture input while displaying a first window and a second window;
based on the screen capture input, displaying a first thumbnail corresponding to a first captured image of the first window, a second thumbnail corresponding to a second captured image of the second window, and a toolbar including a third thumbnail corresponding to a third captured image of a full screen;
receiving a selection input for selecting a thumbnail among the first thumbnail, the second thumbnail, and the third thumbnail; and
based on the selection input, displaying a user interface for editing a selected captured image, among the first captured image, the second captured image, and the third thumbnail, corresponding to the selected thumbnail,
wherein the first thumbnail and the second thumbnail are displayed on an area other than the toolbar.

10. The method of claim 9, wherein the user interface includes a selection guide arranged to the selected captured image.

11. The method of claim 10, wherein the toolbar further includes functions for controlling an image region selected by the selection guide.

12. The method of claim 9, wherein the first window comprises a first execution screen of a first application and the second window comprises a second execution screen of a second application.

13. The method of claim 12, further comprising:
receiving, while displaying the first thumbnail and the second thumbnail, a drag input dragging the first thumbnail and dropping the first thumbnail on the second window; and
based on the drag input, processing the first captured image using the second application.

14. The method of claim 13,
wherein the second application comprises a message application,
wherein the processing comprises transmitting the first captured image using the second application.

15. The method of claim 9, wherein the first window and the second window constitute split screens.

16. The method of claim 9, wherein the first thumbnail and the second thumbnail are displayed as floating images on at least one of the first window and the second window.

17. The electronic device of claim 1, wherein, when executed, the instructions further cause the at least one processor to, end display of the toolbar when a specified period of time elapses without receiving any input.

18. The electronic device of claim 4, wherein, when executed, the instructions further cause the at least one processor to change a display content of the second window depending on an execution state of the second application.

* * * * *